United States Patent
Kim

[11] Patent Number: 5,847,290
[45] Date of Patent: Dec. 8, 1998

[54] APPARATUS AND METHOD FOR MEASURING BOTH SUSPENSION DISPLACEMENT AND SPRING FORCE IN VEHICLE

[75] Inventor: Dong-yun Kim, Seoul, Rep. of Korea

[73] Assignee: Kia Motors Corporation, Seoul, Rep. of Korea

[21] Appl. No.: 704,161

[22] Filed: Aug. 28, 1996

[30] Foreign Application Priority Data

Jul. 11, 1996 [KR] Rep. of Korea .................... 96-28004

[51] Int. Cl.$^6$ ..................................................... G01L 5/00
[52] U.S. Cl. .................. 73/862.641; 73/862.627; 73/862.632; 177/137
[58] Field of Search ................. 73/11.04, 11.07, 73/862.632, 862.641, 862.541, 862.57, 862.629; 177/137

[56] References Cited

U.S. PATENT DOCUMENTS

| | | | |
|---|---|---|---|
| 2,582,886 | 1/1952 | Ruge | 73/862.641 |
| 2,813,709 | 11/1957 | Brier | 177/137 |
| 4,215,454 | 8/1980 | Hagedorn et al. | 177/137 |
| 4,800,751 | 1/1989 | Kobayashi et al. | 73/862.629 |
| 5,127,277 | 7/1992 | Forrester et al. | 73/862.584 |
| 5,327,791 | 7/1994 | Walker | 73/862.628 |

*Primary Examiner*—Ronald L. Biegel

[57] ABSTRACT

An apparatus and a method for measuring both a suspension displacement and a spring force in a vehicle simultaneously measure a suspension displacement and a suspension spring force by attaching a strain gage to a suspension spring. The apparatus for measuring both a suspension displacement and a spring force in a vehicle includes: first to fourth strain gages whose resistance values are varied when a strain is applied thereto; a suspension spring for varying resistances of said strain gages attached thereto; and Wheatstone bridge circuit having a first resistor to fourth resistor, for measuring the suspension displacement and the spring force by using an output voltage to an input voltage which is varied according to a resistance variation outputted from said strain gages.

1 Claim, 2 Drawing Sheets

APPARATUS AND METHOD FOR MEASURING BOTH SUSPENSION DISPLACEMENT AND SPRING FORCE IN VEHICLE

FIELD OF THE INVENTION

The present invention relates to an apparatus and a method for measuring both a suspension displacement and a spring force in a vehicle. More particularly, this invention relates to an apparatus and a method for measuring both a suspension displacement and a spring force in a vehicle which attaches a strain gage to a suspension spring, measure a resistance variation of the strain gage by using a Wheatstone bridge circuit, and thus simultaneously measure a suspension displacement and a suspension spring force.

PRIOR ART

In general, a suspension displacement of vehicle is a relative displacement between a body and an axle, and is measuredby a vertical movement of the axle caused by an irregular road surface during a navigation of a vehicle.

Such suspension displacement is measured by using a revolution angular displacement and a linear angular displacement. A system for measuring the angular displacement is mounted in a hinge point of a lower arm, and another system for measuring the linear angular displacement is mounted in a suspension dampener.

In addition, a suspension apparatus of a vehicle connects a dampener with a spring in order to prevent an unnecessary vibration transmitted to the body. The result being a more comfortable ride and more stable traction.

Recently, ride comfort has also been improved by active and semiactive suspension apparatuses.

A spring force of a suspension spring measuredfrom the active suspension apparatus is measured by a loadcell.

Because the suspension displacement of the vehicle and the spring force of the suspension spring are measured separately by separate devices, there is a problem in accuracy of the measurement.

SUMMARY

It is an object of the present invention to provide an apparatus and a method for measuring both a suspension displacement and a spring force in a vehicle which measure a resistance variation of a strain gage according to a vehicle's running by attaching a strain gage to a suspension spring, thereby measuring a suspension displacement and a suspension spring force at the same time.

In order to achieve this object, an apparatus for measuring both a suspension displacement and a spring force in a vehicle includes:

first to fourth strain gages whose resistance values are varied when a strain is applied thereto;

a suspension spring for varying resistances of said strain gages attached thereto; and Wheatstone bridge circuit having a first resistor to fourth resistor, for measuring the suspension displacement and the spring force by using an output voltage to an input voltage which is varied according to a resistance variation outputted from said strain gages.

BRIEF DESCRIPTION OF THE DRAWINGS

The preferred embodiment of the present invention will now be described more specifically with reference to the following description, appended claims, and the attached drawings wherein:

DETAILED DESCRIPTION

Figure 1:
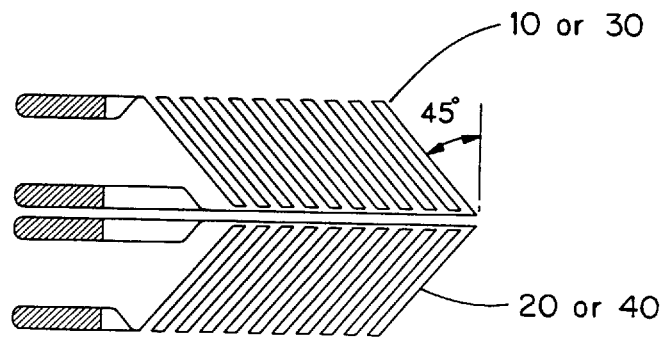
FIG. 1 shows a strain gage for measuring a shearing stress of a vehicle in a preferred embodiment of the present invention.
Figure 2:
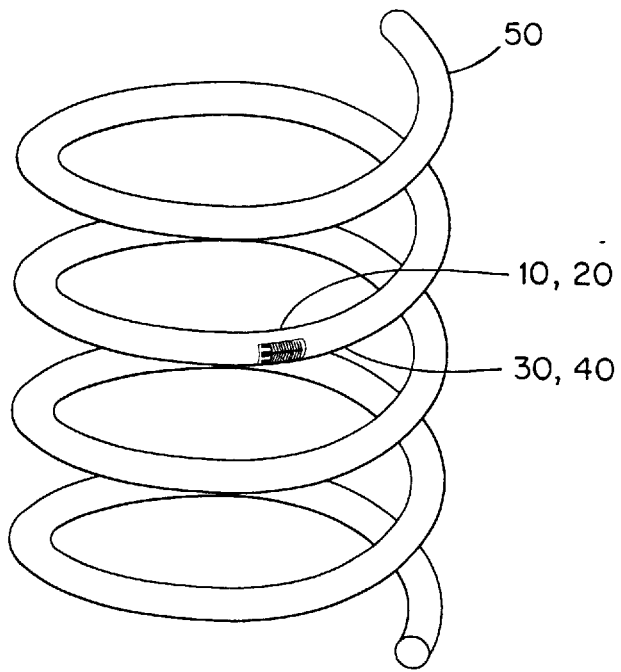
FIG. 2 shows a suspension spring of a vehicle which the strain gage of FIG. 1 is attached thereto, for measuring both a displacement and a spring force in accordance with a preferred embodiment of the present invention.

FIG. 1 shows strain gages 10 and 20 or 30 and 40 for measuring a shearing stress of a vehicle and FIG. 2 shows a suspension spring 50 which strain gages as shown in FIG. 1 are attached thereto, for measuring a suspension displacement and a spring force in a vechicle.

Figure 3:
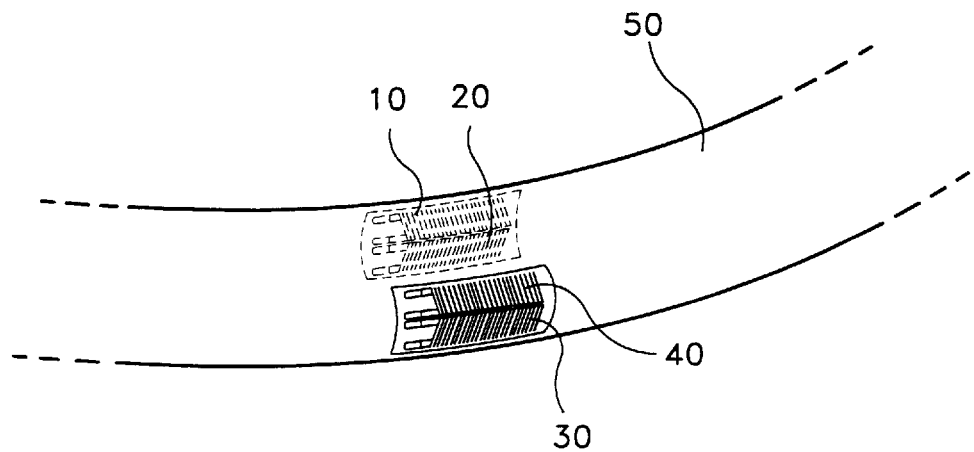
FIG. 3 is a partially enlarged view of a vehicle's suspension spring of FIG. 2.
Figure 4:
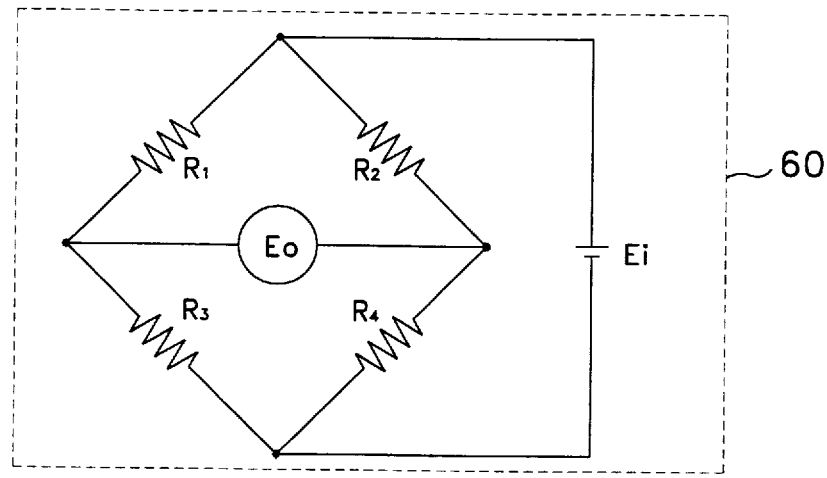
FIG. 4 is a circuit diagram for measuring a displacement and spring force of the suspension spring of FIG. 3 in accordance with a preferred embodiment of the present invention.

Referring to FIGS. 3 and 4, an apparatus for measuring both a suspension displacement and a spring force in a vehicle includes: a suspension spring 50 made of coil, of which length is varied according to a navigation of vehicle; first to fourth strain gages 10, 20, 30, & 40 attached to the suspension spring 50, whose resistance values are varied according to a length variation of the suspension spring 50; and a Wheatstone bridge circuit 60 which generates an output voltage based on resistance variations of resistors R1 to R4 of the strain gages 10 to 40.

The Wheatstone bridge circuit 60 measures variations of the first to fourth resistors 10,20, 30 & 40 by using the output voltage Eo with respect to the input voltage Ei. Herein, the value of the first resistor R1 is measured by the first strain gage 10, the value of the second resistor R2 is measured by the second strain gage 20, the value of the third resistor R3 is measured by the third strain gage 30, and the value of the fourth resistance R4 is measured by the fourth strain gage 40.

Referring to FIG. 3, the strain gages 10 to 40 are attached to the suspension spring 50 made of coil, a suspension spring force P and a suspension displacement δ are measured, thereby achieving the following equation (1)

$$8DP/\pi d^3 = Gd\delta/\pi NaD^2 \qquad (1)$$

where, D is an average diameter of coil of the suspension spring 50, P is a suspension spring force, d is a diameter of coil, G is a shearing modulus of coil, δ is a suspension displacement, and Na is the effective turn ratio of the suspension spring 50.

Values of the left and right sides in the equation (1) are equal to a shearing stress τ of the suspension spring 50, thereby achieving the following equation (2):

$$\tau = 8DP/\pi d^3 = Gd\delta/\pi NaD^2 \qquad (2)$$

In the equation (2), the shearing stress τ of the suspension spring 50 can induce the suspension force P and the suspension displacement δ at the same time.

A direction of a principal stress is 2*θ=90° on the basis of characteristics of the suspension spring made of coil, so that θ=45°. Accordingly, when the strain gages 10 to 40 are attached toward 45°, the shearing stress τ about a torsion of the suspension spring 50 is equal to a tension-compression stress σ about a length of the suspension spring 50, thereby achieving the following equation (3):

$$\tau = \sigma \quad (3)$$

According to the above equation (3), the following equation (4) is achieved:

$$\sigma = \tau = 8DP/\pi d^3 = Gd\delta/\pi NaD^2 \quad (4)$$

According to the above equation (4), the following equations (5) and (6) are also attained:

$$P = \pi \tau d^3/8D \quad (5)$$

$$\delta = \tau \pi NaD^2/Gd \quad (6)$$

In the equations (5) and (6), a maximum torsional stress τ produced on a surface of the suspension spring, generates resistance variations of the strain gages 10 to 40, because the strain gages 10 to 40 are attached to the suspension spring 50.

Referring to FIG. 4, by the Wheatstone bridge circuit 60, the following equation (7) is achieved about variations of the resistors R1 to R4 of the strain gages 10 to 40.

$$\delta R/R = F(\delta l/l) = F\epsilon \quad (7)$$

where, F is a strain gage ratio, R is an equivalent resistor of the resistors R1 to R4, l is a length of the suspension spring 50, and ε is a strain ratio of the suspension spring 50.

According to the equation (7), the following equations (8) and (9) are achieved:

$$\epsilon = \sigma/Eo \quad (8)$$

$$\sigma = Eo/F * \delta R/R \quad (9)$$

The δR/R of the right side of the above equation (9) can be computed by using the following equation (10) of the Wheatstone bridge circuit 60.

$$Eo = (1+\mu)/2 * \delta R/R * Ei \quad (10)$$

In the equation (10), μ is a poisson ratio of the Wheatstone bridge circuit 60 when reducing the length of the suspension spring 50.

The output voltage Eo of the Wheatstone bridge circuit 60 is computed by using the equation (10). The tension-compression stress σ of the suspension spring (50) is computed by substituting the output voltage Eo in the equation (9).

Since the tension-compression stress σ is equal to the shearing stress τ according to the equation (3), the suspension spring force is computed by substituting the tension-compression stress σ for the shearing stress τ in the equation (5), and the suspension displacement δ is also computed in the equation (6).

As described above, the present invention simultaneously measures the suspension displacement and the suspension spring force by attaching the strain gage to a suspension spring, and also measures them by using the output voltage of the Wheatstone bridge circuit, thereby easily measuring them.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A method for measuring both a suspension displacement and a spring force in a vehicle including first to fourth strain gages whose resistance values are varied when a strain is applied thereto, a suspension spring for varying resistance of the strain gages, and a Wheatstone bridge circuit, comprising the steps of:

attaching the first to fourth strain gages whose resistance values are varied according to a variation of the suspension spring, to the suspension spring;

calculating an output voltage about a resistance variation of each strain gage on the basis of an input voltage by using the Wheatstone bridge circuit and following equation (1);

calculating a tension-compression stress from the following equation (2) using the output voltage calculated from equation (1);

calculating a suspension displacement and a suspension spring force from following equations (3) and (4) using the tension-compression stress calculated from equation (2)

$$Eo = (1+\mu)/2 * \delta R/R * Ei \quad (1)$$

$$\sigma = \tau Eo/F * \delta R/R \quad (2)$$

$$P = \pi \tau d'RD \quad (3)$$

$$\delta = \tau \pi NaD/Gd \quad (4)$$

wherein Eo is output voltage, μ is a poisson ratio when reducing the length of the suspension spring, δ is suspension displacement, R is an equivalent resistor of the resistors of the strain gages, Ei is input voltage, σ is tension-compression stress of the suspension spiring, τ is shearing stress of the suspension spring, F is a strain gage ratio, P is a suspension siring force, d is a diameter of coil of the suspension spring, D is an average diameter of coil of the suspension spring, Na is effective turn ratio of the suspension spring, and G is a shearing modulus of coil.

* * * * *